US012724541B2

(12) United States Patent
Musin

(10) Patent No.: US 12,724,541 B2
(45) Date of Patent: Sep. 1, 2026

(54) SYSTEM AND METHOD FOR UTILIZATION OF STORAGE DEVICES

(71) Applicant: SK hynix Inc., Gyeonggi-do (KR)

(72) Inventor: Sergei Musin, Gdansk (PL)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/529,376

(22) Filed: Dec. 5, 2023

(65) Prior Publication Data

US 2025/0181251 A1 Jun. 5, 2025

(51) Int. Cl.
*G06F 3/06* (2006.01)

(52) U.S. Cl.
CPC .......... *G06F 3/0616* (2013.01); *G06F 3/0659* (2013.01); *G06F 3/0679* (2013.01); *G06F 2212/7207* (2013.01)

(58) Field of Classification Search
CPC .... G06F 3/0616; G06F 3/0659; G06F 3/0679; G06F 2212/7207
See application file for complete search history.

(56) References Cited

U.S. PATENT DOCUMENTS 6,789,157 B1 * 9/2004 Lilja .................. G06F 12/0246 711/170
11,704,043 B1 * 7/2023 Throgmorton ...... G06F 11/1469 711/162
2006/0064549 A1 * 3/2006 Wintergerst .......... G06F 12/121 711/134
2008/0168310 A1 * 7/2008 Saretto ................ G06F 11/1417 714/E11.02
2012/0014178 A1 1/2012 Nagashima et al.
2014/0059278 A1 * 2/2014 Schuh .................. H04L 9/0819 711/103
2014/0101368 A1 4/2014 Rose et al.
2014/0122776 A1 * 5/2014 El Maghraoui ....... G06F 3/0631 711/E12.008
2016/0034206 A1 * 2/2016 Ryan ...................... G06F 3/064 711/103

* cited by examiner

*Primary Examiner* — Kalpit Parikh
(74) *Attorney, Agent, or Firm* — IP & T GROUP LLP

(57) ABSTRACT

A system and a method for operation of storage devices. The system includes a host and a storage device coupled to the host and including a processor, firmware and a memory. The host uploads a plugin to the storage device such that the uploaded plugin is stored in the memory, controls the processor of the storage device to execute the stored plugin, downloads from the storage device an execution result after the execution of the stored plugin, and optionally return the storage device back to normal operation.

19 Claims, 6 Drawing Sheets

100
300
Drive with FW Plugin
310
CPU(s)
320
DRAM
SRAM
L2P
340
FW
Plugin
loop
400
330
NAND
200
Host
Plugins code
Compiler
Plugins library
Upload plugin
I/O operations
Results 300G
Pool of drives used as computational resources
FPGA drive
SoC drive (developm ent quality)
SoC drive (production quality)
Wear-out drive
prior Generation Product
Next Generation Product
FW Plugins
time
FIRST DEVELOPMENT STAGE
SECOND DEVELOPMENT STAGE
N-th DEVELOPMENT STAGE 300A
Drive with FW Plugin
310A
CPU(s)
320A
DRAM
SRAM
L2P
340A
FW
Plugin
loop
400A
Flash ops
330A
NAND(read only)
200A
Host
Upload plugin
Plugins library
I/O operations
Workload
Statistics
Agent
210A
300B
Normal Drive
310B
CPU(s)
320B
DRAM
SRAM
L2P
FW
340B
loop
Flash ops
330B
NAND
200B
Host
210B
Statistics
Agent
I/O ops
Workload 300
Drive with FW Plugin
310
Device
CPU(s)
320
DRAM
SRAM
L2P
340
FW
Plugin
loop
400
Flash ops
330
NAND
Upload plugin
Response
200
Host
Plugins library
220
Analyser

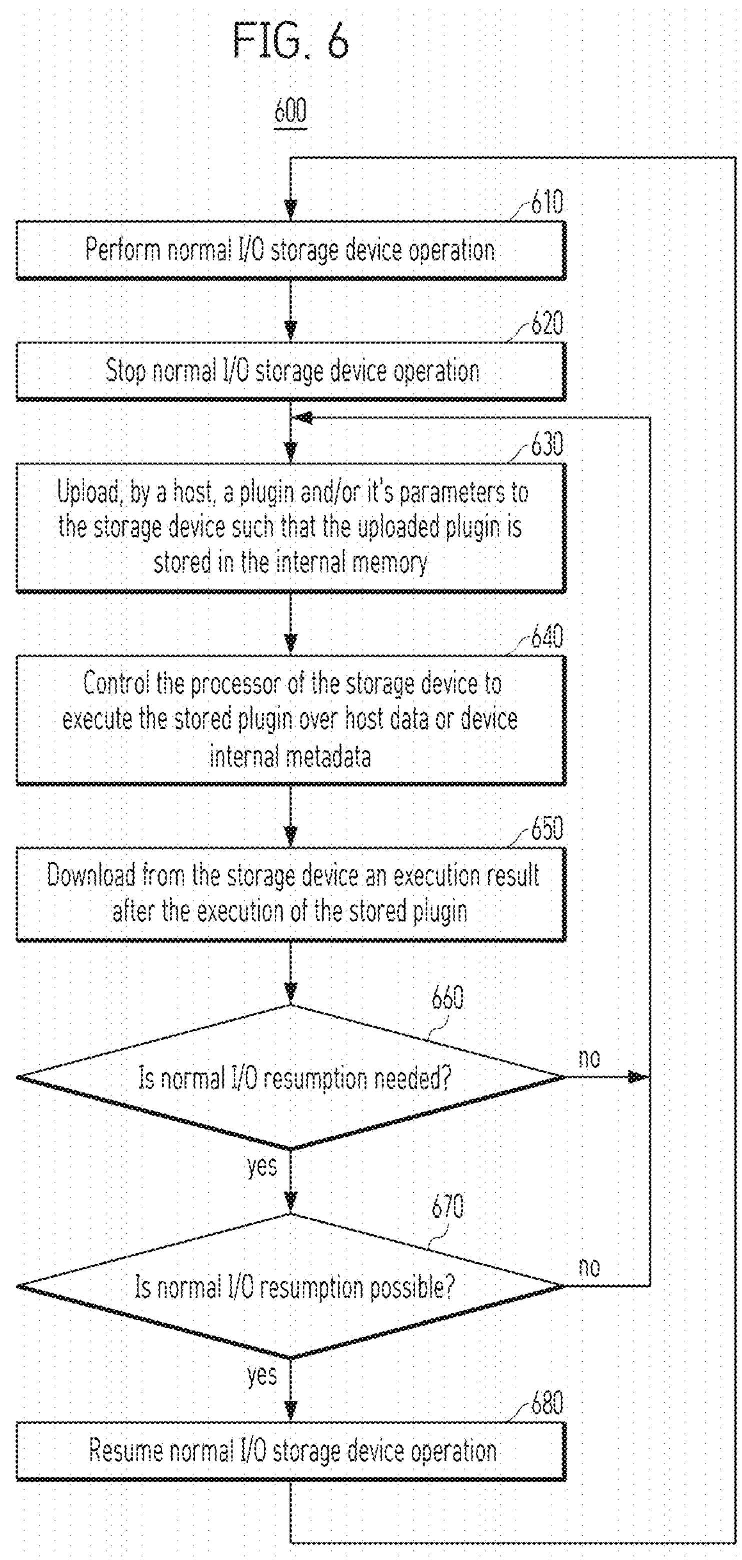
FIG. 6
600
610
Perform normal I/O storage device operation
620
Stop normal I/O storage device operation
630
Upload, by a host, a plugin and/or it's parameters to the storage device such that the uploaded plugin is stored in the internal memory
640
Control the processor of the storage device to execute the stored plugin over host data or device internal metadata
650
Download from the storage device an execution result after the execution of the stored plugin
660
Is normal I/O resumption needed?
no
yes
670
Is normal I/O resumption possible?
no
yes
680
Resume normal I/O storage device operation

SYSTEM AND METHOD FOR UTILIZATION OF STORAGE DEVICES

BACKGROUND

1. Field

Embodiments of the present disclosure relate to a system including a storage device.

2. Description of the Related Art

Modern non-volatile storage media such as a storage device (e.g., solid state drive (SSD)) is a system-on-chip (SoC) device with gigabytes of volatile memory and terabytes of non-volatile memory operated by firmware (FW) for storing and retrieving persistent data. FW is critical for developing SSD product, and its development may take several years. During that time, developers may use multiple revisions of test sample drives. After release and qualification of SSD product, exploitation on the customer side continues until drives wear out or become outdated by the next generation product. Both development and exploitation may leave some drives which are no longer used for normal input and output (I/O) operations due to various reasons, but can be utilized.

SUMMARY

Aspects of the present invention include a system and a method for reuse and utilization of storage devices as general purpose computation resources.

In one aspect of the present invention, a system includes a host and a storage device coupled to the host and including a processor, firmware and a memory. The host is configured to: upload a plugin to the storage device such that the uploaded plugin is stored in the memory; control the processor of the storage device to execute the stored plugin; download from the storage device an execution result after the execution of the stored plugin; and optionally return the storage device back to a normal operation.

In one aspect of the present invention, a method for operating a host coupled to a storage device including a processor, firmware and a memory, the method comprising: uploading a plugin to the storage device such that the uploaded plugin is stored in the memory; controlling the processor of the storage device to execute the stored plugin; downloading from the storage device an execution result after the execution of the stored plugin; and optionally returning the storage device back to a normal operation.

Additional aspects of the present invention will become apparent from the following description.

BRIEF DESCRIPTION OF THE DRAWINGS

FIG. 6 is a flowchart illustrating a method for operating plugin execution in a data processing system in accordance with one embodiment of the present invention.

DETAILED DESCRIPTION

Figure 1:
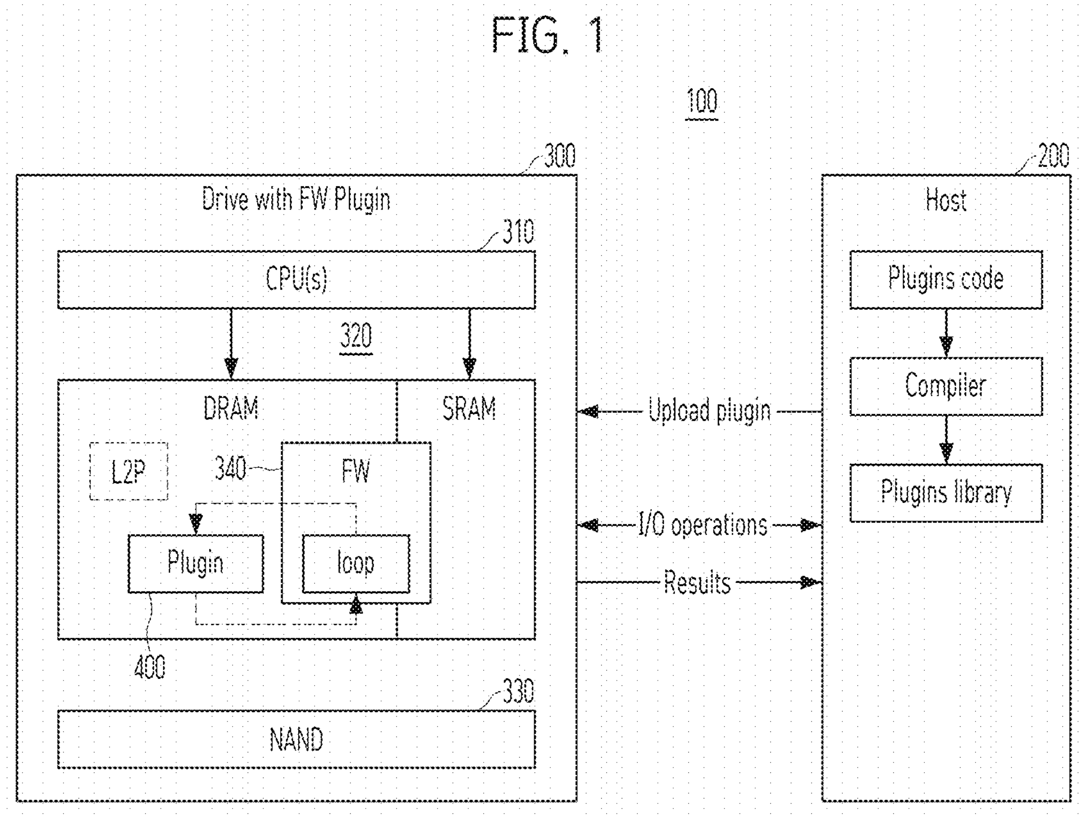
FIG. 1 is a data processing system supporting plugin execution in accordance with one embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of the embodiments of the present invention is provided below along with accompanying figures that illustrate aspects of the present invention. The present invention is described in connection with such embodiments, but the present invention is not limited to any embodiment. The present invention encompasses numerous alternatives, modifications and equivalents. Numerous specific details are set forth in the following description in order to provide a thorough understanding of the present invention. These details are provided for the purpose of example; the present invention may be practiced without some or all of these specific details. For clarity, technical material that is known in technical fields related to the present invention may not been described in detail.

FIG. 1 is a data processing system 100 supporting plugin execution in accordance with one embodiment of the present invention.

Referring to FIG. 1, the data processing system 100 may include a host 200 and a storage device 300.

The host 200 may be implemented with any of various types of electronic devices. In various embodiments, the host 200 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host 200 may include a portable electronic device such as a mobile phone, a smart phone, an e-book, an MP3 player, a portable multimedia player (PMP), and/or a portable game player.

The storage device 300 may be implemented with any of various types of storage devices such as a solid state drive (SSD) and/or a memory card.

The storage device 300 may include a controller and a memory device 330. The memory device 330 may be implemented with a NAND flash memory. The controller may control overall operations of the memory device 330. The controller may include a processor 310 and a memory 320. The processor 310 may be implemented with one or more central processing units (CPUs). The memory 320 may include a dynamic random access memory (DRAM) and a static random access memory (SRAM). The processor 310 may drive firmware (FW) 340 to control general operations of the data processing system 100. The FW 340 may be stored in the memory 320 and referred to as a flash translation layer (FTL). For example, the FW 340 may perform operations such as logical-to-physical (L2P) mapping, wear leveling, garbage collection, and/or bad block handling. The L2P mapping is referred to as logical block addressing (LBA). In addition to the elements above, the storage device 300 may include elements such as a host interface, a memory interface and an error correction code (ECC) component.

In general, the storage device 300 may receive a request from the host 200 and operate in response to the received request. For example, the request may be a read request, a write request and an erase request.

Figure 2:
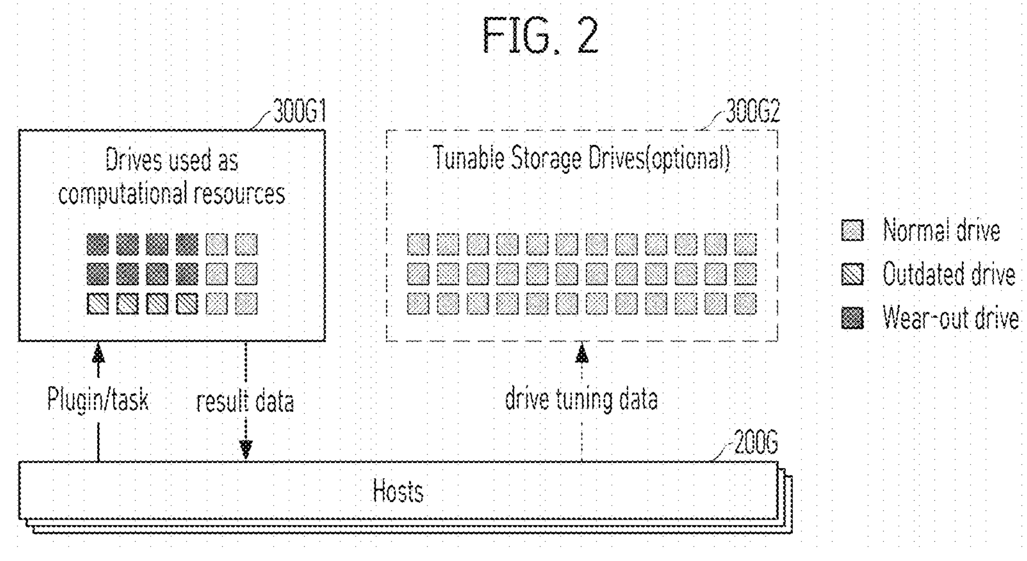
FIG. 2 illustrates one example of utilization of storage devices in accordance with one embodiment of the present invention.
Figure 3:
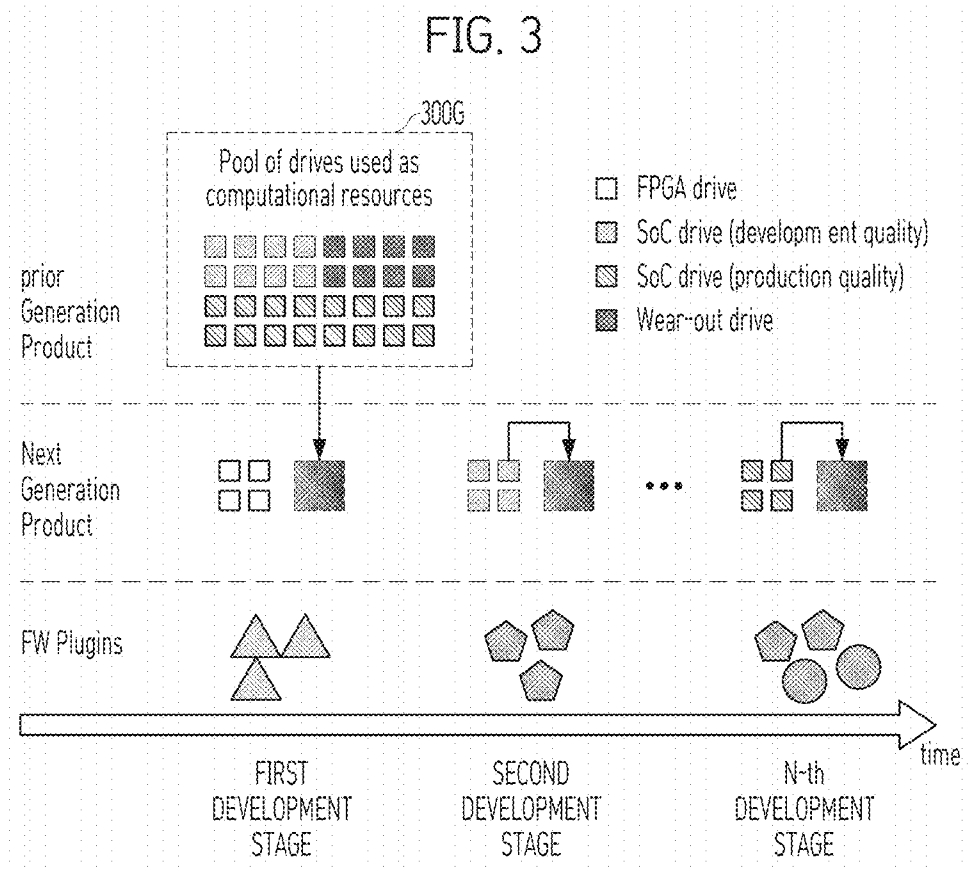
FIG. 3 illustrates another example of utilization of storage devices in accordance with one embodiment of the present invention.

In accordance with embodiments of the present invention, the storage device 300 allows running (executing) specialized external applications inside the storage device 300 and providing the execution results to the host 200 according to the particular request. Such specialized application may be referred to as FW 'plugin' 400 or 'task'. That is, the storage device 300 may be a drive with FW plugin 400. In some embodiments, through the FW plugin 400, the storage device 300 may be used as computational resources at a product exploitation stage of the storage device 300 as shown in FIG. 2 and/or at product development stages of the storage device 300 as shown in FIG. 3.

In FIG. 1, FW execution may be processed at high level as infinite loop executing host commands like "get next command-execute command". In most cases, an internal SoC of the storage device 300 uses as the processor 310 general-purpose CPU architecture like ARM, RISC-V, and so on. Thus, a standard toolchain for the given architecture may be used to build the plugin 400 (e.g., compiler, linker, archiver, assembler, etc.).

The FW plugin 400 may be a standalone application intended to be executed by the internal processor 310 with several limitations. For example, the FW plugin 400 may not use hardware floating-point unit (FPU). Plugins may have much less complexity comparing to FW code. Plugins may be developed and modified on demand, and compiled by multiple compilers. The download process of the plugins is normally separated from device FW. The plugin may be normally compiled to a monolithic binary file (i.e., ELF) without necessarily needing external dependencies related to operating system (OS), runtime, etc. Since plugins co-exist with the main FW 340 and reuse CPU 310 and DRAM 320, the plugins may only be stored in free memory which is not used for normal drive input and output (I/O) operation (i.e., normal I/O operation for a storage device such as program, read and erase operations). Therefore, the size of the plugin depends on available hardware resources which may differ for various drive models and FW revisions. Alternatively, a reconfigurable FW for switching drive from normal drive I/O operation to a lower capacity drive, a "short-stroked" drive or a read-only drive may be used in order to free additional memory for plugins.

The plugin execution environment may utilize available hardware to allow paging and/or other features to make memory more flexible. However, in general case, memory used for code/data of the plugin is contiguous. Memory rights enforcement like read-only/execute disable features are not necessary. In one embodiment, once the plugin obtains control, it is a user's responsibility not to use I/O operations during plugin execution, and no watchdog support is expected.

Since the plugin contains a native code for a given processor, the plugin is potentially unsecure and has access to peripheral devices. During the development stage, plugins are used by FW developers and security is not a concern, but some security enforcement mechanisms are required for plugins at the exploitation stage. For example, plugins which are distributed to customers by the vendor may be digitally signed to avoid execution of potentially untrusted code. The memory safety can be guaranteed by using the appropriate programming language (e.g., Rust) and compiler features.

In some embodiments, the plugin 400 may communicate with external environment using direct function calls, which may be either function pointer table in a shared memory, or some kind of dynamic linking. If devices within SoC are memory mapped, the devices may be accessed directly as memory references without using any application programming interface (API). Other functionality like logging, heap, synchronization etc. may use explicit API calls. Note that, in one embodiment, API is fixed for a given FW build so that the API is not changed without FW rebuild except for the case with runtime linker, because the runtime linker has ability to link the plugin to any callable function within FW image. Interrupts and exceptions may be handled via specific API. For example, interrupt waiting may be implemented as polling of interrupt controller registers. Thus, no specific API would be needed for this example.

The execution of the FW plugin 400 may be performed in the following stages: (S1) uploading the plugin binary to drive's internal memory using FW interfaces; (S2) uploading required parameters for the plugin 400, if any; (S3)

starting plugin execution (during plugin execution, the storage device 300 stops I/O normal operations); (S4) input processing by the plugin 400; and (S5) downloading execution results of the plugin 400 (if possible and needed, this resumes FW I/O execution).

The execution of the FW plugin 400 may be performed in detail as the following:

1. Preparing Plugin Binary Image

The plugin may be written in any language that can produce binary code for target CPU. To simplify FW, it may be compiled to binary code allowing so called "execution in place". This means that binary code is ready for execution just after copying to target memory, it does not need any preparations like relocation, address resolution, etc.

2. Preparing Input Parameters

Input parameters may be usually represented as a formatted file. Since a drive does not implement a file system, the plugin can access files as arrays in memory. Therefore, in one embodiment, the input parameters are converted in a format allowing their use directly from memory.

3. Distribute Plugin Instances Across Drives

The host 200 that is responsible for the statistics gathering may assign each drive to some part of work.

4. Upload Plugins to Drives

The host 200 may upload compiled plugin binary code along with input parameters to the internal memory 320 of the storage device 300. This upload may be performed using a particular command, e.g., vendor-specific commands which are implemented in FW 340. The plugin and its related data (i.e., input parameters) may be individually uploaded to each storage device of a pool of storage devices. For this example, the binary codes associated with the plugin should be the same whereas input parameters may be not the same.

5. Start

The host 200 may issue a particular command to start a plugin for each storage device 300. This command causes the storage device 300 to stop normal FW execution and I/O operation until the plugin is completed. Depending on plugin algorithms, multiple cores (for multicore SoCs) can or cannot be used. FW 340 may maintain the set of pointers to its functions in a main memory, and these functions at predefined addresses may be used as a FW-plugin interface, i.e., an interface between FW 340 and the plugin 400. The plugin entry point may be extracted by FW 340 via standard procedure for the given binary format (e.g., ELF). One set of these functions may be domain-specific, but usually the set consists of interaction with environment: console, debug output, UARTs, etc. Also, the set may include an interface to internal devices like memory control, hardware accelerators, etc. The function call may be performed using standard application binary interface (ABI) for the given CPU architecture. When a user initiates the plugin call, FW 340 may determine entry point of the plugin 400, which is located at predefined location in the memory 320, and then may call this address as part of execution of a main loop of FW 340.

6. Perform Polling

In case that the storage device 300 allows executing vendor-specific commands during the plugin execution, the commands may be used to poll the status of plugin execution. Otherwise, when the storage device 300 is not capable of executing anything except the plugin, then execution profiling may be required before the plugin is started. For example, execution profiling may be performed on a single drive to determine how much time execution takes. Then, the host 300 may try to communicate with drives only after the period is passed.

7. Download Execution Results

Once the plugin execution completes, the host 200 downloads execution results from each storage device 300 using vendor specific commands. Output of execution results may be binary data (or text) in drive memory. Since drive memory is not directly accessible, vendor specific commands are required.

8. Find Parameters which Yield Optimal Performance

After downloading execution results (i.e., parameters), the host 200 may find optimal parameters for best performance. These parameters may be converted to the format used for parameters updates, and then the parameters may be digitally signed and stored to a particular library (e.g., parameters library).

One benefit of monitoring and sharing of statistics by plugins may be simplification of main FW, since it does not need to contain task-specific code. Also, this approach makes possible extraction of data which is not known at the development stage. This data may be workload-specific, and therefore different customers may have different sources of the statistics.

FIG. 2 illustrates one example of utilization of storage devices in accordance with one embodiment of the present invention. Each of the storage devices may be used as computational resources at the product exploitation stage. The storage devices 300G1 may include normal drives, outdated drives, and/or worn-out drives.

At the product exploitation stage, the FW plugin gathers and/or processes statistics based on workload of each of the hosts 200G and/or NAND behavior. Such statistics can be directly usable or will become usable for other drives 300G2. Thus, the host 200 may use it later for tuning purpose of other drives 300G2. For example, instead of replacing outdated or worn-out storage drives, these worn-out drives can be available to each of the hosts 200G for a predetermined time to perform computations necessary for statistics gathering and then sharing the computations results with other drives 300G2.

Figure 4:
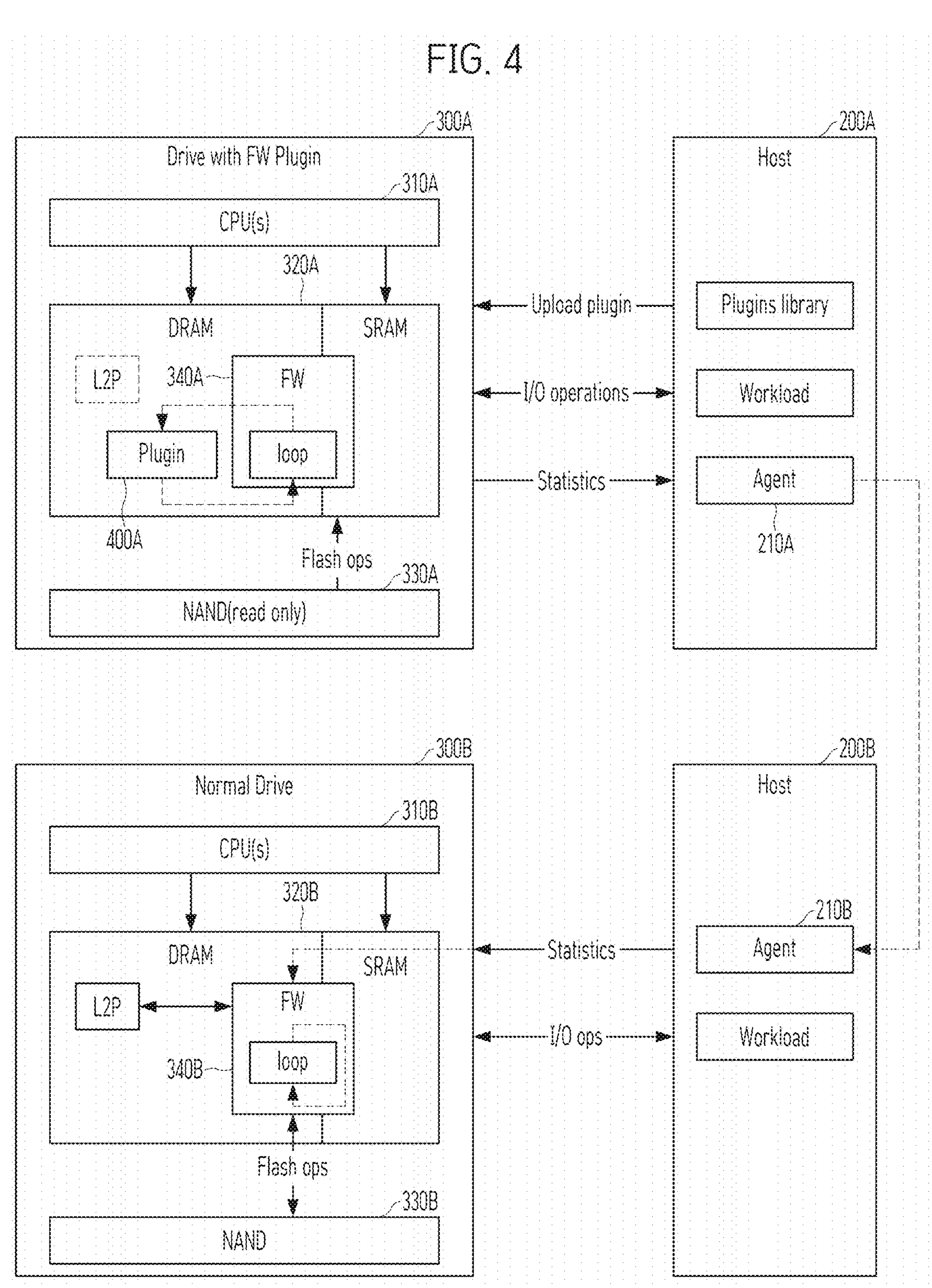
FIG. 4 illustrates data exchange between storage devices in accordance with one embodiment of the present invention.

One possible use for FW plugins is to determine optimal parameters for the FW algorithms, which may depend on workload as shown in FIG. 4. Optimal parameters found by a single drive can be distributed to other drives 300G2. For example, when some drives switch to read-only drives due to NAND wear-out, it may distribute algorithms parameters, which are optimal at the near end-of-life operating stage for a given workload. Such statistics may help to improve latency of other operational drives in a system. As shown in FIG. 2, a system may consist of large pool of drives 300G1, and each drive runs monitoring code as a FW plugin. All computations of the drives 300G1 are performed in parallel, so execution time of the drives 300G1 is reduced significantly. System control, the plugin upload, and results gathering are performed by one control host of the hosts 200G that communicates with drives via single host, or distributed network including one control host or PC and other hosts or PCs in the network to which target drives are connected.

FIG. 3 illustrates another example of utilization of storage devices in accordance with one embodiment of the present invention. Each of the storage devices may be used as computational resources at one or more product development stages. The storage devices 300G may include FPGA drives, SoC drives with development quality, SoC drives with production quality and worn-out drives.

At the product development stage, various drives can be utilized as computational resources for simulation, statistics gathering and analytics. In this case, FW plugins allow verifying and testing various options of FW algorithms and their parameters without reset of FW.

FIG. 4 illustrates data exchange between storage devices in accordance with one embodiment of the present invention.

As mentioned above, one possible use for FW plugins is to determine optimal parameters for the FW algorithms, which may depend on workload as shown in FIG. 4.

FW 340A may use external statistics to improve its own operation for a given workload. Such statistics are usually uploaded to the drive 300A by using vendor-specific commands. Host 200A may include software agent 210A which is used to optimize performance. When the agent 210A decides to extract statistics from the drive 300A, the agent 210A uploads the plugin 400A from plugins library and then initiates plugin execution and data gathering. Once statistics are received, host 200A may distribute the statistics across one or more other drives (e.g., 200B) in the network by using software communication protocols between agents 210A, 210B. Finally, all agents may use vendor commands to upload gathered data to corresponding drives. Thus, useful data can be automatically distributed.

Figure 5:
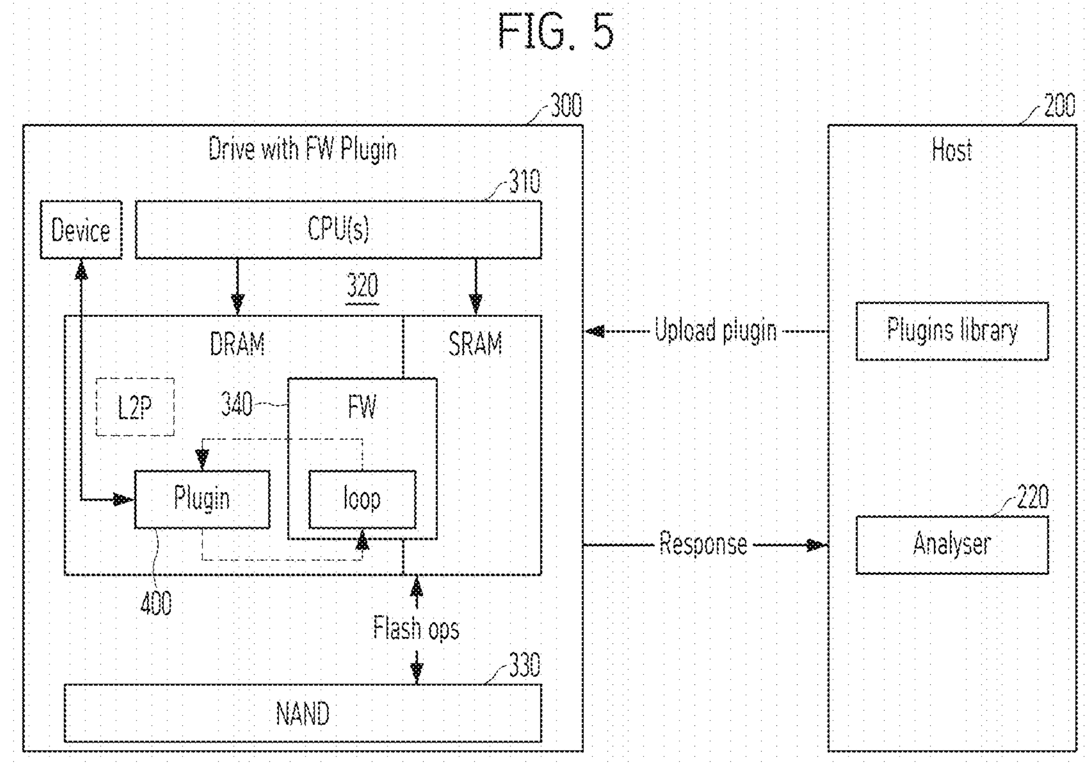
FIG. 5 illustrates one usage of plugins at a product development stage in accordance with one embodiment of the present invention.

FIG. 5 illustrates one usage of plugins at a product development stage in accordance with one embodiment of the present invention.

One possible usage of plugins at the development stage may be for the processing of log data. Logging is one important part of the product development. Log data may be used for debugging, optimization and identifying of performance bottlenecks. Logging usually produces a lot of data (i.e., gigabytes) which may be stored in the internal memory 320 (i.e., DRAM). Processing of such data at the host side 200 requires downloading of the whole log to the host 200. However, plugin 400 may optimize logs parsing, indexing and analysis by performing parts of the work by plugins executed in the drive 300 itself. Lower capacity version(s) of FW (executed on a higher capacity drive with larger amount of DRAM) may be used to store sufficient amount of log data.

As shown in FIG. 5, event log may be preprocessed inside the drive 300 by using FW Plugin 400.

A firmware log has a large number of log points, each of the long points may contain additional data related to the event. Therefore, log items have different sizes and may not be accessed as an array. If in some cases, there is a demand to know only the statistical distribution, when for example the final data after processing is few kilobytes, not gigabytes.

Event preprocessing may be performed as in the following non-limiting stages (ST1, ST2, ST3, and ST4):

(ST1) A drive 300 with the log enabled is subjected to target workload and other experiments. The log is stored in the internal memory 320 (i.e., DRAM) as a sequence of arbitrary sized events.

(ST2) A developer uploads and runs plugin 400 which counts designated events and calculates event properties like distribution.

(ST3) The processing is therefore performed by the drive 300. The log is never extracted nor even seen by the host 200.

(ST4) The result of the plugin execution is also stored in the DRAM and is available for download by vendor specific commands.

FIG. 6 is a flowchart illustrating a method for operating plugin execution in a data processing system in accordance with one embodiment of the present invention.

Referring to FIG. 6, the method 600 includes, at operation 610, performing normal input and output (I/O) operation (execution) for a storage device such as program, read and erase operations. Operation 620 includes stopping the normal I/O operation for the storage device. Operation 630 includes uploading, by a host, a plugin and/or it's parameters to the storage device such that the uploaded plugin is stored in the internal memory. Operation 640 includes controlling the processor of the storage device to execute the stored plugin over host data or device internal metadata. Operation 650 includes downloading from the storage device an execution result after the execution of the stored plugin. Operation 660 includes determining whether resumption of the normal I/O operation is needed. If it is determined that the resumption of the normal I/O operation is needed, operation 670 is performed. Operation 670 includes determining whether resumption of the normal I/O operation is possible. If it is determined that the resumption of the normal I/O operation is possible, operation 680 is performed. Operation 680 includes resuming of the normal I/O operation for the storage device.

In some embodiments, the host is configured to: compile the plugin to binary code and upload the compiled plugin to the storage device.

In some embodiments, the host is further configured to: upload input parameters with a particular form capable of being used directly from the memory.

In some embodiments, the host is configured to: upload the plugin to the storage device using a particular command which are implemented in the firmware.

In some embodiments, the host controls the storage device to execute the stored plugin by issuing a particular command to the storage device such that the stored plugin is executed by the firmware under control of the processor.

In some embodiments, the firmware determines an entry address of the memory for the stored plugin and calls the address to execute the stored plugin.

In some embodiments, the host downloads from the storage device the execution result using a particular command.

In some embodiments, the host provides the execution result to one or more other storage devices.

In some embodiments, the storage device includes one of a normal solid state drive (SSD), an outdated SSD or a worn-out SSD.

As described above, embodiments of the present invention provide for reuse and utilization of storage devices such as outdated SSD or a worn-out SSD as general purpose computation resources.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives. Furthermore, the embodiments may be combined to form additional embodiments.

What is claimed is:

1. A system comprising:

a host; and a storage device coupled to the host and including a processor, firmware and an internal memory, wherein the host is configured to:

upload a plugin, having both a) input parameters for the plugin in a format allowing use as directly provided and b) compiled binary code ready for execution without further preparation, to the internal memory of the storage device such that the uploaded plugin is a compiled plugin stored in the internal memory;

control the processor of the storage device to execute the stored plugin comprising the compiled plugin;

download from the storage device an execution result after the execution of the stored plugin;

after the execution of the stored plugin which processes statistics including optimal parameters that are workload specific to the storage device not known at a development stage of the storage device, gather at the host the statistics including the optimal parameters that are workload specific to the storage device not known at a development stage of the storage device and share the statistics including the optimal parameters that are workload specific to the storage device with one or more other storage devices separate from the storage device; and return the storage device back to normal input and output (I/O) execution.

2. The system of claim 1, wherein the host is configured to: form the compiled binary code and upload the compiled plugin to the storage device.

3. The system of claim 2, wherein the host is further configured to: upload the input parameters with a particular form capable of being used directly from the internal memory.

4. The system of claim 1, wherein the host is configured to: upload the plugin to the storage device using a particular command which are implemented in the firmware.

5. The system of claim 1, wherein the host controls the storage device to execute the stored plugin by issuing a particular command to the storage device such that the stored plugin is executed by the firmware under control of the processor.

6. The system of claim 5, wherein the firmware determines an entry address of the memory for the stored plugin and calls the address to execute the stored plugin.

7. The system of claim 1, wherein the host downloads from the storage device the execution result using a particular command.

8. The system of claim 7, wherein the host provides the execution result to the one or more other storage devices.

9. The system of claim 1, wherein the storage device includes one of a normal solid state drive (SSD), an outdated SSD or a worn-out SSD.

10. The system of claim 1, wherein the plugin having the compiled binary code ready for execution is stored in a free memory of the internal memory of the storage device which is not used for the normal I/O execution including program, read and erase operations.

11. A method for operating a host coupled to a storage device including a processor, firmware and an internal memory, the method comprising:

uploading a plugin, having both a) input parameters for the plugin in a format allowing use as directly provided and b) compiled binary code ready for execution without further preparation, to the internal memory of the storage device such that the uploaded plugin is a compiled plugin stored in the internal memory;

controlling the processor of the storage device to execute the stored plugin comprising the compiled plugin;

downloading from the storage device an execution result after the execution of the stored plugin;

after the execution of the stored plugin which processes statistics including optimal parameters that are workload specific to the storage device not known at a development stage of the storage device, gathering at the host the statistics including the optimal parameters that are workload specific to the storage device not known at a development stage of the storage device and sharing the statistics including the optimal parameters that are workload specific to the storage device with one or more other storage devices separatee from the storage device; and returning the storage device back to normal input and output (I/O) execution.

12. The method of claim 11, wherein the uploading of the plugin includes: uploading the compiled plugin to the storage device.

13. The method of claim 12, further comprising: uploading the input parameters with a particular form capable of being used directly from the internal memory.

14. The method of claim 11, wherein the uploading of the plugin includes: uploading the plugin to the storage device using a particular command which are implemented in the firmware.

15. The method of claim 11, wherein the controlling of the processor of the storage device includes:

controlling the storage device to execute the stored plugin by issuing a particular command to the storage device such that the stored plugin is executed by the firmware under control of the processor.

16. The method of claim 15, wherein the controlling of the processor of the storage device further includes:

determining, by the firmware, an entry address of the memory for the stored plugin and calling the address to execute the stored plugin.

17. The method of claim 11, wherein the downloading of the execution result includes: downloading from the storage device the execution result using a particular command.

18. The method of claim 17, further comprising:

providing, by the host, the execution result to the one or more other storage devices.

19. A system for reuse of a storage device after the storage device becomes an outdated or worn-out storage, the system comprising:

a host for communication with the storage device; and the storage device including a processor, firmware and an internal memory, wherein the host is configured to:

upload a plugin, having both a) input parameters for the plugin in a format allowing use as directly provided and b) compiled binary code ready for execution without further preparation, to the internal memory of the storage device comprising the outdated or worn-out storage such that the uploaded plugin is a compiled plugin stored in the internal memory of the storage device;

control the processor of the storage device to execute the stored plugin comprising the compiled plugin;

download from the storage device an execution result after the execution of the stored plugin;

after the execution of the stored plugin which processes statistics including optimal parameters that are workload specific to the storage device not known at a development stage of the storage device, gather at the host the statistics including the optimal parameters that are workload specific to the storage device not known at a development stage of the storage device and share the statistics including the optimal parameters that are workload specific to the storage device with one or more other storage devices separate from the storage device; and return the storage device back to normal input and output (I/O) execution.

* * * * *